(12) United States Patent
Khan

(10) Patent No.: US 12,730,361 B1
(45) **Date of Patent: *Sep. 8, 2026**

(54) DYNAMIC LENS FILTER AND ILLUMINATED FILTER TRAY ASSEMBLY

(71) Applicant: Adam Khan, Los Angeles, CA (US)

(72) Inventor: Adam Khan, Los Angeles, CA (US)

( * ) Notice: Subject to any disclaimer, the term of this patent is extended or adjusted under 35 U.S.C. 154(b) by 120 days.

This patent is subject to a terminal disclaimer.

(21) Appl. No.: 19/008,887

(22) Filed: Jan. 3, 2025

Related U.S. Application Data

(63) Continuation of application No. 18/121,184, filed on Mar. 14, 2023, now Pat. No. 12,216,384.

(60) Provisional application No. 63/322,460, filed on Mar. 22, 2022.

(51) Int. Cl.

| | |
|---|---|
| ***G03B 17/12*** | (2021.01) |
| ***G02B 7/00*** | (2021.01) |
| ***G02B 7/02*** | (2021.01) |
| ***G03B 15/03*** | (2021.01) |
| ***G03B 17/56*** | (2021.01) |

(52) U.S. Cl.
CPC ............. *G03B 17/12* (2013.01); *G02B 7/006* (2013.01); *G02B 7/023* (2013.01); *G03B 15/03* (2013.01); *G03B 17/565* (2013.01); *G03B 2215/0567* (2013.01)

(58) Field of Classification Search
CPC ................................................ G03B 11/00–06
See application file for complete search history.

(56) References Cited

U.S. PATENT DOCUMENTS

| | | | |
|---|---|---|---|
| 3,161,718 | A | 12/1964 | De Luca |
| 3,577,898 | A | 5/1971 | Bragg |
| 3,940,775 | A | 2/1976 | Bodnar |
| 4,436,400 | A | 3/1984 | Charis |
| 4,816,876 | A | 3/1989 | Pryor |
| 5,034,761 | A | 7/1991 | Jones |
| 5,208,624 | A | 5/1993 | MacKay |
| 5,294,948 | A | 3/1994 | Merkt |
| 5,548,450 | A | 8/1996 | Kang |
| 5,684,637 | A | 11/1997 | Floyd |
| 7,006,141 | B1 | 2/2006 | Neil et al. |
| 7,088,530 | B1 | 8/2006 | Recco et al. |
| 7,142,369 | B2 | 11/2006 | Wu et al. |
| 7,194,200 | B1 | 3/2007 | Behlow |
| 7,690,801 | B2 | 4/2010 | Amphlett |

(Continued)

*Primary Examiner* — Leon W Rhodes, Jr.
(74) *Attorney, Agent, or Firm* — Goldstein Law Offices, P.C.

(57) ABSTRACT

A dynamic lens filter and illuminated filter tray assembly for use with a camera having a matte box includes a rotatable lens filter having an effects medium that reflects light and an illuminated filter tray having light sources that shine light onto the effects medium. Various lighting effects may be controlled and achieved by aligning the illuminated filter tray with the lens filter within the matte box such that light emanating from the illuminated filter tray strikes the effects medium while images are being captured. The lens filter includes a pair of lenses that seal the lens filter to form a cavity containing the effects medium. The lens filter is coupled to a rotating mechanism that rotates the lens filter to create changing visual effects in images captured by the camera. The illuminated filter tray includes a wireless transceiver coupled to the light sources for controlling the light sources remotely.

20 Claims, 9 Drawing Sheets

(56) References Cited

U.S. PATENT DOCUMENTS

| | | | |
|---|---|---|---|
| 7,950,799 | B2 | 5/2011 | Mills et al. |
| 8,224,175 | B2 | 7/2012 | Yang |
| 8,517,563 | B2 | 8/2013 | Ma et al. |
| 8,774,619 | B2 | 7/2014 | Harris |
| 8,922,902 | B2 | 12/2014 | Blum et al. |
| 9,033,495 | B2 | 5/2015 | Gupta et al. |
| 9,684,227 | B1 | 6/2017 | Smith et al. |
| 9,851,477 | B2 | 12/2017 | Gupta et al. |
| 10,051,165 | B2 | 8/2018 | Sperber |
| 10,101,637 | B2 | 10/2018 | Peddecord |
| 10,146,061 | B2 | 12/2018 | Huang |
| 10,295,887 | B2 | 5/2019 | Yang |
| 11,184,510 | B2 | 11/2021 | Sadahiro et al. |
| 11,599,008 | B2 * | 3/2023 | Zeng .................... G03B 11/045 |
| 11,921,402 | B2 * | 3/2024 | Wampler ............... G03B 11/00 |
| 2003/0133206 | A1 | 7/2003 | Belefant |
| 2009/0116118 | A1 | 5/2009 | Frazier et al. |
| 2015/0015977 | A1 | 1/2015 | Karasawa |
| 2019/0041800 | A1 | 2/2019 | Husson et al. |

* cited by examiner

DYNAMIC LENS FILTER AND ILLUMINATED FILTER TRAY ASSEMBLY

CROSS-REFERENCE TO RELATED APPLICATIONS

This application is a Continuation of U.S. patent application Ser. No. 18/121,184, filed on Mar. 14, 2023, which claims the benefit of priority of U.S. Provisional Patent Application Ser. No. 63/322,460, filed on Mar. 22, 2022, which are relied upon and incorporated herein by reference in their entirety. The entire disclosure of each publication or patent document mentioned herein is incorporated by reference.

TECHNICAL FIELD

The present disclosure relates generally to camera lenses and filters. More particularly, the present disclosure relates to an assembly including a fluid lens filter for creating visual effects on a camera display and images and an illuminated filter tray that selectively controls the quantity or intensity of light contacting the fluid lens filter.

BACKGROUND

Lens filters have been used to enhance an image for decades. Some examples of lens filters include color conversion, neutral density, diopters, optical flat, polarizing, diffusion, low contrast, and special effects. Lens filters are used for blocking light, softening an image, creating an effect, protecting the lens, and blocking wavelengths, among other things. Existing camera filters have one thing in common-they are static and do not change. Accordingly, there is a need for a lens filter that is capable of producing an effect that changes and moves during image capture, such that no two shots are ever the same.

Lens filters are commonly positioned in front of a camera lens via a matte box. A matte box is a device used on the end of a lens to block the sun or other light sources to prevent glare and lens flare. Matte boxes may hold glass or plastic lens filters in place in front of the camera lens. They include slots or receptacles that receive lens filters parallel to the camera lens. Typical matte boxes are supported by two rods that run the length of the camera, while others are supported by the lens itself. In the early days of production, a lens flare was considered a mistake and undesirable. Today, however, lens flares and lens artifacts are desired and seen as cinematic. Accordingly, there is a need for providing controlled light into the matte box to achieve desired lens flares and lens artifacts, and variety and control over lighting effects.

While these units may be suitable for the particular purpose employed, or for general use, they would not be as suitable for the purposes of the present disclosure as disclosed hereafter.

In the present disclosure, where a document, act or item of knowledge is referred to or discussed, this reference or discussion is not an admission that the document, act or item of knowledge or any combination thereof was at the priority date, publicly available, known to the public, part of common general knowledge or otherwise constitutes prior art under the applicable statutory provisions; or is known to be relevant to an attempt to solve any problem with which the present disclosure is concerned.

While certain aspects of conventional technologies have been discussed to facilitate the present disclosure, no technical aspects are disclaimed and it is contemplated that the claims may encompass one or more of the conventional technical aspects discussed herein.

BRIEF SUMMARY

An aspect of an example embodiment in the present disclosure is to provide a dynamic lens filter and illuminated filter tray assembly for use with a camera having a camera lens and a matte box positioned in front of the camera lens, in which the assembly may be used to achieve various novel visual effects on an image taken by the camera. Accordingly, the present disclosure provides a lens filter including a visual effects medium configured to reflect, distort, or refract light into the camera lens to create a display of continuously changing bokeh, and an illuminated tray including various controllable light sources that may shine a light onto the filter lens, wherein a variety of visual effects may be achieved and controlled by aligning, in parallel, the illuminated filter tray with the lens filter within the matte box such that light emanating from the illuminated filter tray strikes the effects medium of the lens filter generating the visual effects.

An aspect of an example embodiment in the present disclosure is to provide a dynamic lens filter and illuminated filter tray assembly in which the amount of light striking the lens filter may be controlled remotely. Accordingly, the present disclosure provides an illumination module including a wireless transceiver coupled to the light sources that may be operated wirelessly from a GUI/API to control the intensity or brightness of the light sources, thereby controlling the amount of light shining on the effects medium to achieve a desired visual effect.

An aspect of an example embodiment in the present disclosure is to provide a dynamic lens filter and illuminated filter tray assembly in which the visual effects created by the lens filter changes or moves during image capture and which may be changed or altered while the light source intensity or brightness remains constant. Accordingly, the present disclosure provides a lens filter housing including a rotating mechanism coupled to the lens filter, which enables rotation of the lens filter to agitate or move the effects medium to achieve changing visual effects on images being captured by a camera. Additionally, the rotating mechanism enables movement of the lens filter relative to the illuminated filter tray to achieve a separate visual effect from those created by the light sources.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

BRIEF DESCRIPTION OF THE DRAWINGS

In the drawings, like elements are depicted by like reference numerals. The drawings are briefly described as follows.

The present disclosure now will be described more fully hereinafter with reference to the accompanying drawings, which show various example embodiments. However, the present disclosure may be embodied in many different forms and should not be construed as limited to the example embodiments set forth herein. Rather, these example embodiments are provided so that the present disclosure is thorough, complete and fully conveys the scope of the present disclosure to those skilled in the art.

DETAILED DESCRIPTION OF THE PREFERRED EMBODIMENTS

Figure 8:
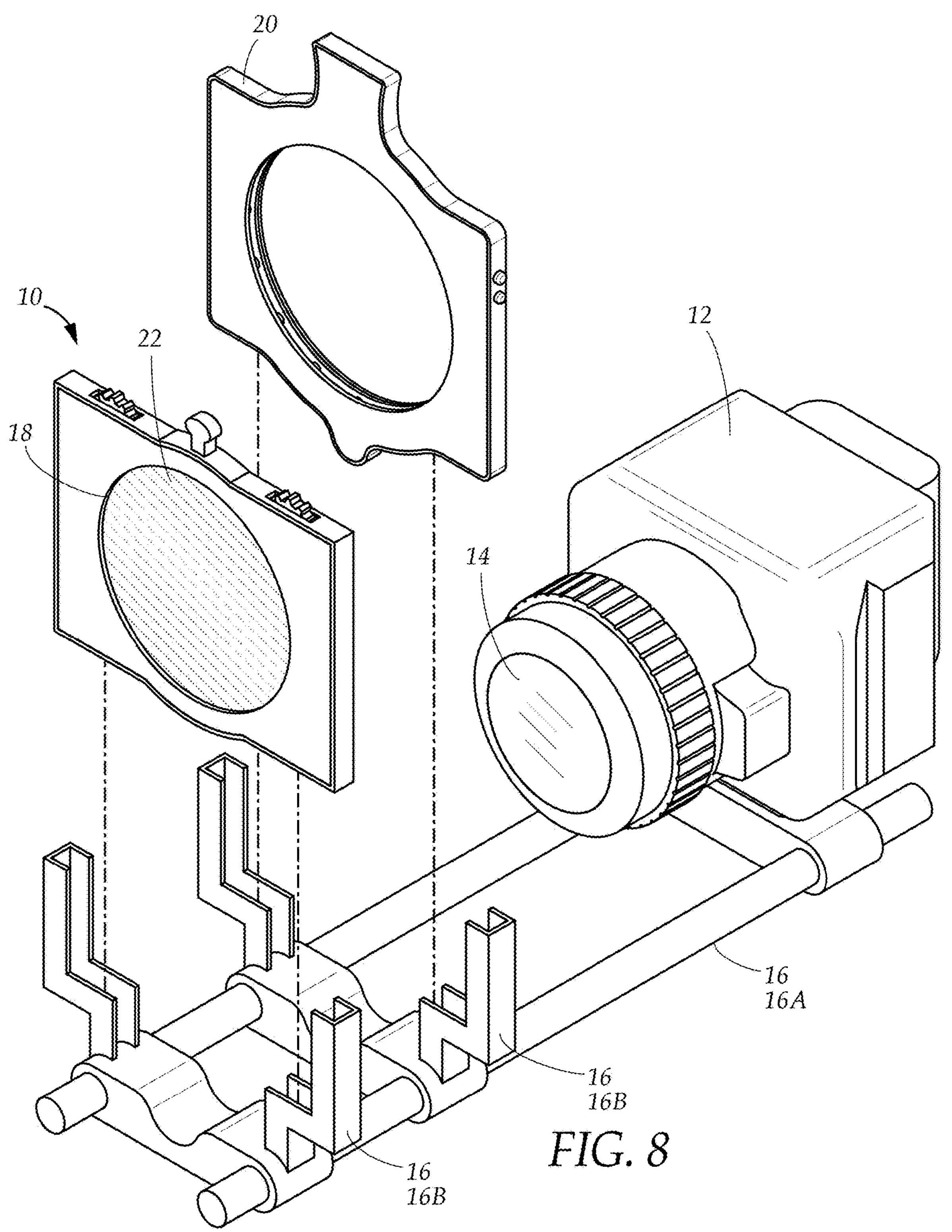
FIG. 8 is an exploded view of the dynamic lens filter and illuminated filter tray assembly, illustrating a manner in which the lens filter and illuminated filter tray are mounted onto a matte box, which has been mounted onto a camera, in order to operate the assembly according to one embodiment of the present disclosure.
Figure 9:
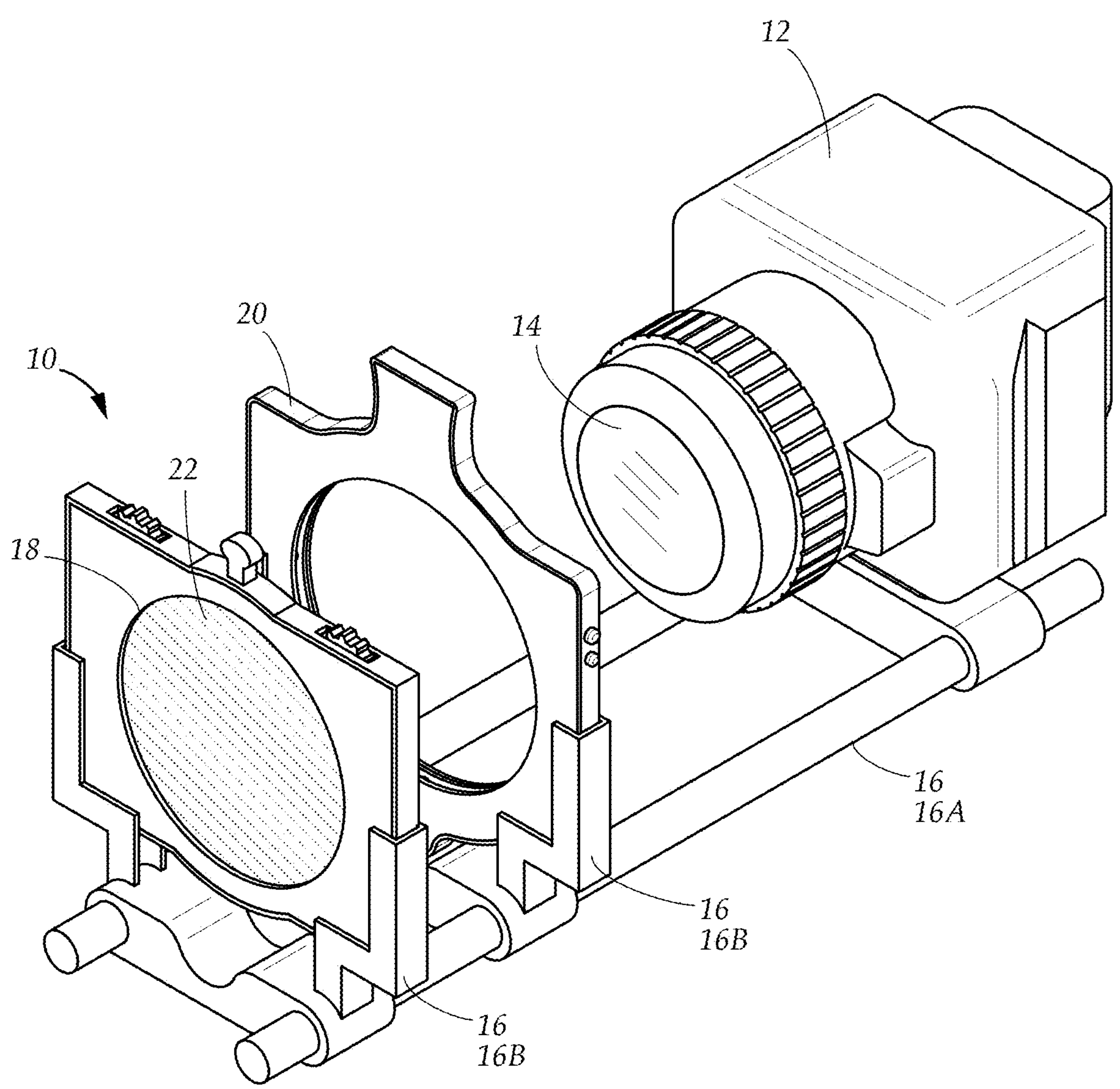
FIG. 9 is a perspective view of the dynamic lens filter and illuminated filter tray assembly with the lens filter and illuminated filter tray mounted onto a matte box, which has been mounted onto a camera, illustrating a configuration of the illuminated filter tray assembly with respect to a camera in one operation of the assembly according to one embodiment of the present disclosure.
Figure 10:
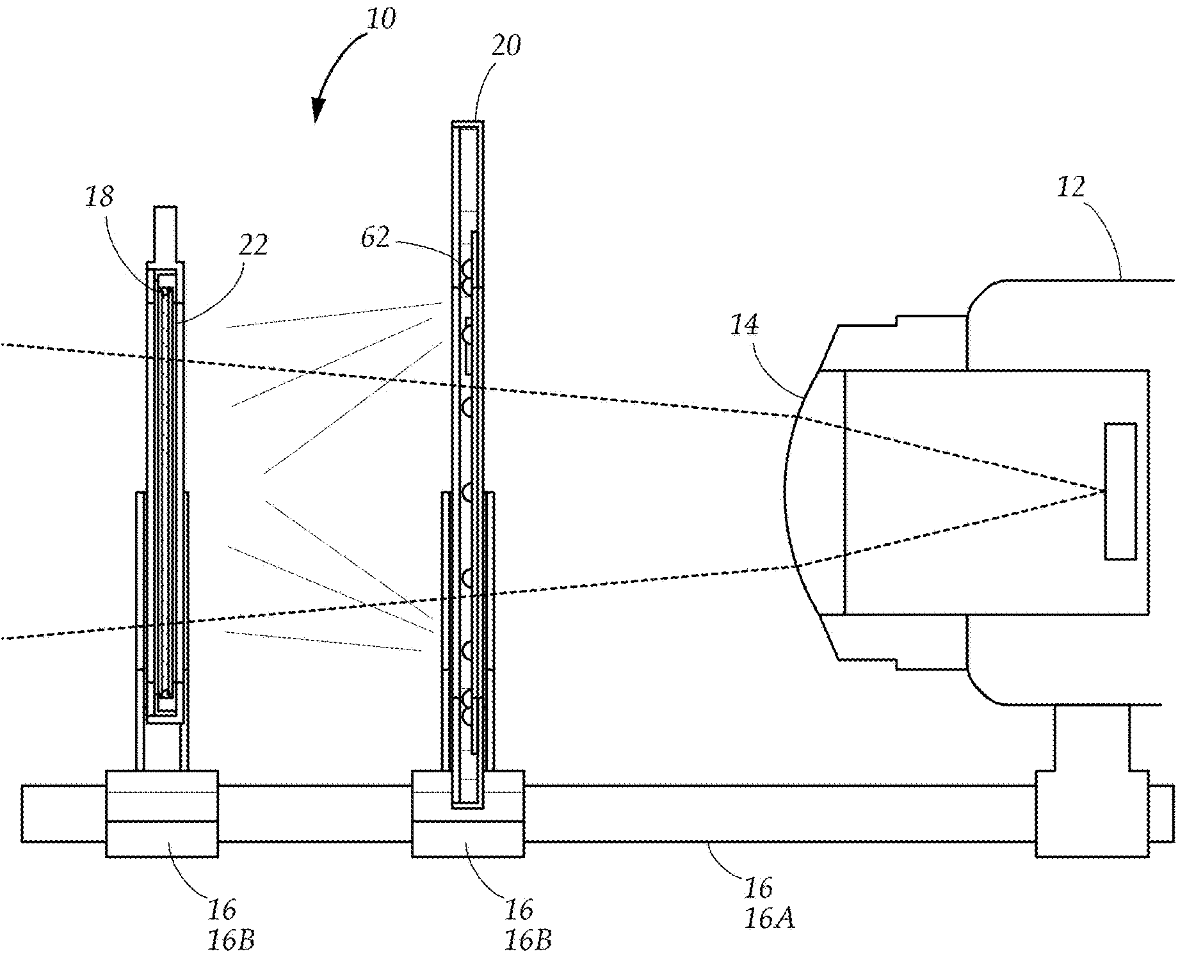
FIG. 10 is a cross-sectional side view of the dynamic lens filter and illuminated filter tray assembly with the lens filter and illuminated filter tray mounted onto a matte box, which has been mounted onto a camera, illustrating the illuminated filter tray shining light onto the lens filter to achieve a visual effect on the lens in one operation of the assembly according to one embodiment of the present disclosure.

FIG. 8, FIG. 9, and FIG. 10 illustrates a dynamic lens filter and an illuminated filter tray assembly 10 for use with a camera 12 having a camera lens 14 and a matte box 16 positioned in front of the camera lens 14. Note, a matte box typically includes a rectangular housing, which surrounds the lens filter and camera lens, and a frame including various slots or receptacles for receiving one or more lens filters within the matte box. For simplicity, only the frame of the matte box 16 is shown in the foregoing figures. The frame of the matte box 16 includes adaptor bars 16A connecting the matte box 16 to the camera and filter slots 16B for removably receiving a variety of lens filters.

The dynamic lens filter and illuminated filter tray assembly 10 comprise a lens filter 18 and an illuminated filter tray 20 that work in conjunction to provide various visual effects through the lens of a camera. The lens filter 18 fits into the matte box 16 and includes an effects medium 22 that reflects light into the camera lens 14 to create a display of continuously changing bokeh. The illuminated filter tray 20 also fits into the matte box 16 and selectively shines light onto the lens filter 18, providing for more variety and control over lighting effects created by the effects medium 22. Note, though the lens filter 18 and the illuminated filter tray 20 work in conjunction, they may be used with a camera independently of one another. For example, the lens filter 18 may be used to interact with external light sources to produce various desired effects rather than interacting with the light sources emanating from the illuminated filter tray 20.

In one operation of the dynamic lens filter and illuminated filter tray assembly 10, the illuminated filter tray 20 is positioned between the lens filter 18 and the camera lens 14 and the light emanating from the illuminated filter tray 20 is oriented toward the lens filter 18 and away from the camera lens 14. The illuminated filter tray 20 is aligned with the lens filter 18 in parallel such that light emanating from the illuminated filter tray 20 strikes the effects medium 22 of the lens filter 18 generating a visual effect. In this way, a user may control and vary the visual effects created on the camera lens 14 by selectively controlling the quantity or intensity of light that strikes the effects medium 22. In another operation of the dynamic lens filter and illuminated filter tray assembly 10, the lens filter 18 is positioned between the illuminated filter tray 20 and the camera lens 14. The light emanating from the illuminated filter tray 20 is oriented toward the lens filter 18 and toward the camera lens 14 to create a different visual effect than in the orientation, in which the illuminated filter tray 20 is positioned between the lens filter 18 and the camera lens 14.

Figures 1, 1A:
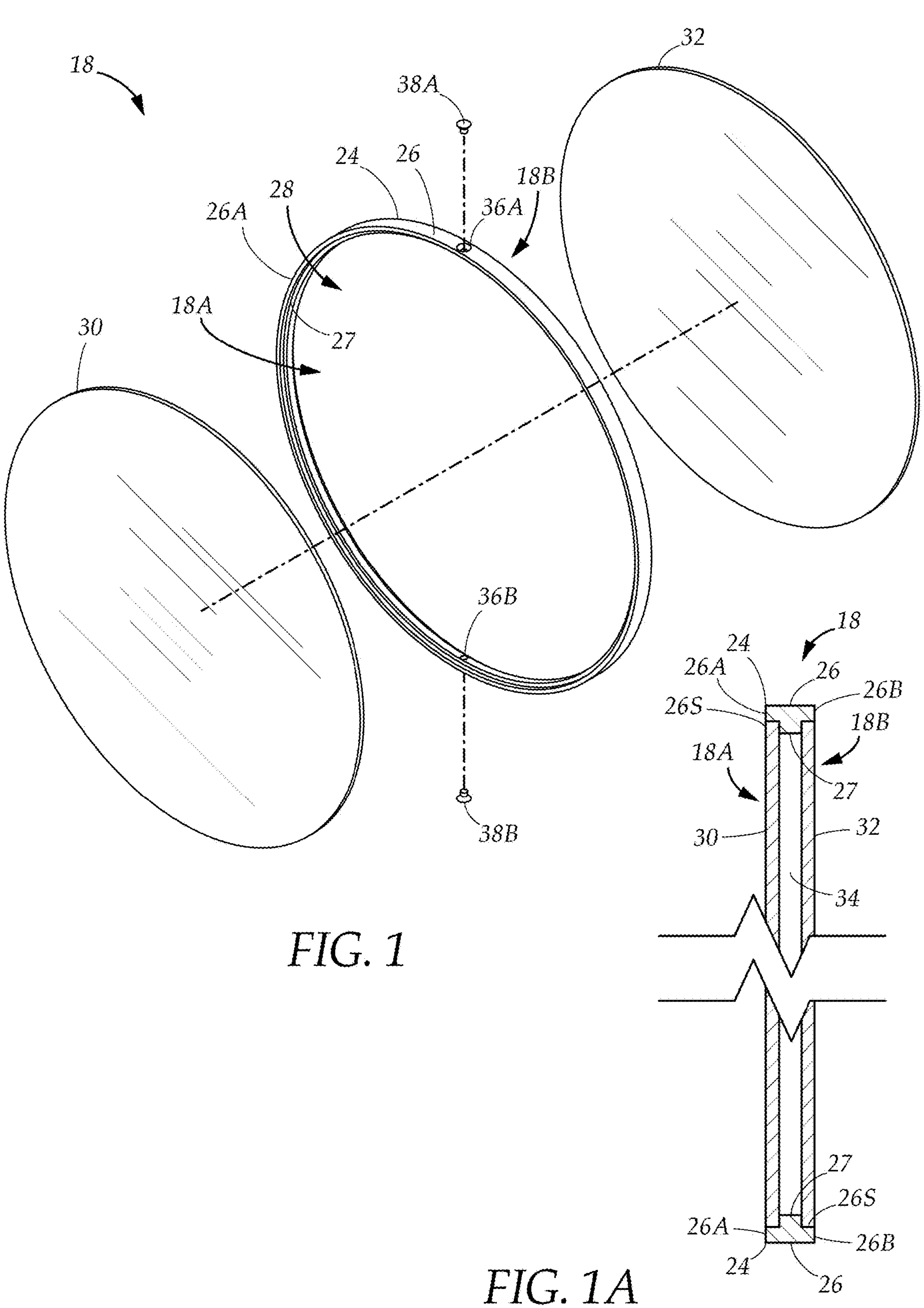
FIG. 1 is an exploded view of the lens filter of the dynamic lens filter and illuminated filter tray assembly, illustrating the components of the lens filter according to one embodiment of the present disclosure.
FIG. 1A is a crosse-sectional view of the lens filter of the dynamic lens filter and illuminated filter tray assembly, illustrating the arrangement of the components of the lens filter and the cavity of the lens filter according to one embodiment of the present disclosure.
Figure 2:
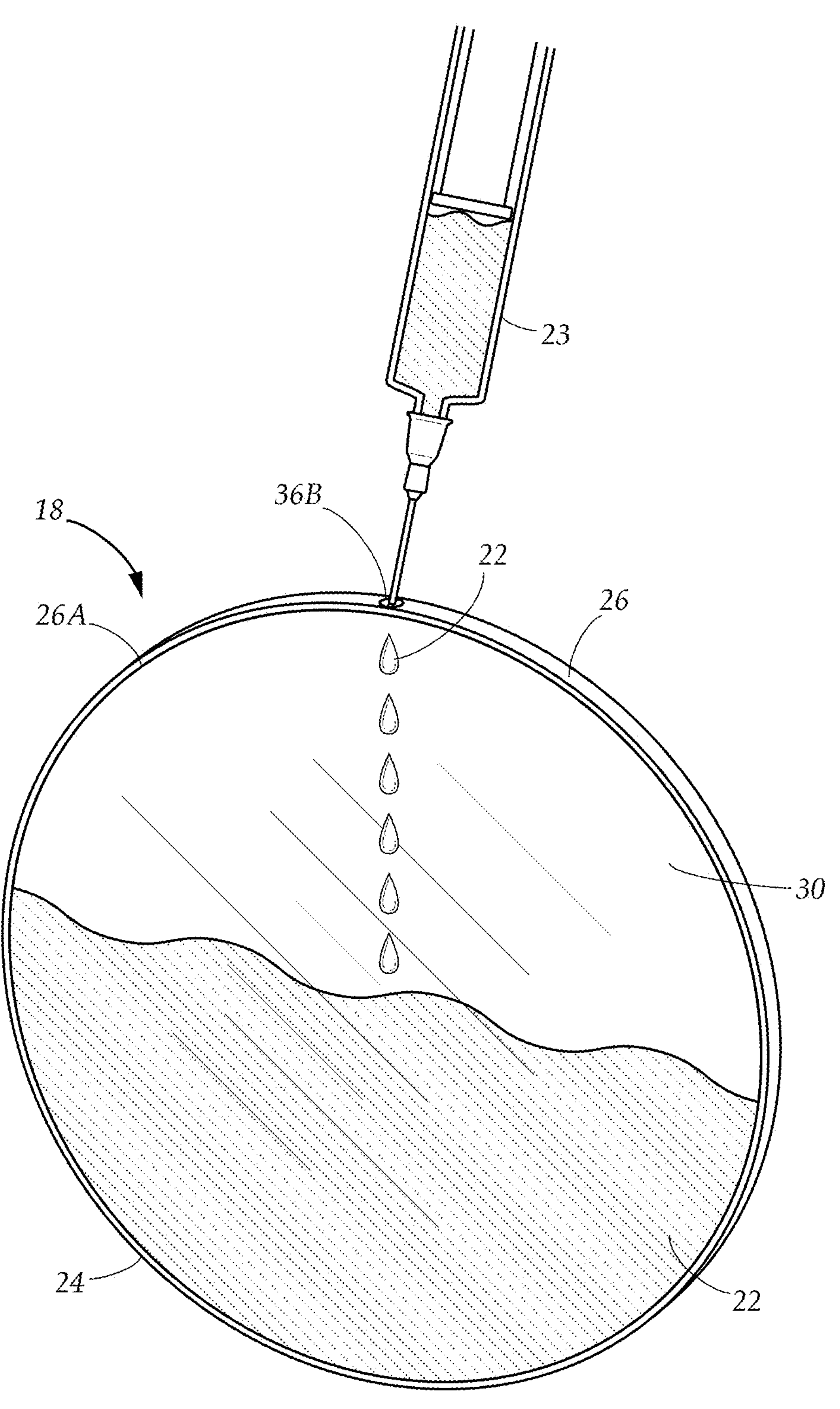
FIG. 2 is a perspective view of the lens filter of the dynamic lens filter and illuminated filter tray assembly, illustrating the effects medium within the cavity of the lens filter and a manner in which the cavity may be filled with the effects medium according to one embodiment of the present disclosure.

Referring now to FIG. 1, FIG. 1A, and FIG. 2 the lens filter 18 comprises a front 18A, a rear 18B opposite the front 18A, and a body 24 including a sidewall 26 defining a filter lens opening 28 extending fully between the front 18A and the rear 18B, a front lens 30 disposed on the front 18A, and a rear lens 32 disposed on the rear 18B. The filter lens opening 28 extends axially through the body 24. The sidewall 26 includes a front edge 26A disposed at the front 18A, a rear edge 26B disposed at the rear 18B, and an interior surface 26S having a shoulder 27 extending therearound. The front lens 30 is attached to the front edge 26A and the rear lens 32 is attached to the rear edge 26B. The front lens 30 and the rear lens 32 abut the shoulder 27 and are aligned with the front edge 26A and the rear edge 26B, respectively. In this way, the front lens 30 and the rear lens 32 are flush with the front edge 26A and the rear edge 26B, respectively. The front lens 30 and the rear lens 32 are attached via a waterproof or solvent resistant adhesive. In embodiments, the sidewall 26 is circular forming a ring shape, such that the filter lens opening 28 and the overall lens filter 18 are circular to match the circular lens of a camera.

The front lens 30 and the rear lens 32 each include a diameter that is substantially equal to the diameter of the lens filter opening 28 such that the front lens spans the entirety of the filter lens opening 28 at the front 18A and the rear lens 32 spans the entirety of the filter lens opening 28 at the rear 18B. The front lens 30 and the rear lens 32 seal the filter lens opening 28 at the front edge 26A and at the rear edge 26B, respectively, forming a watertight and leakproof cavity 34 that is positioned inside of the body 24. The front lens 30 and the rear lens 32 are transparent; however, in some embodiments, may be opaque or include different levels of transparency to control the amount of light passing therethrough to the effects medium 22. The front lens 30 and the rear lens 32 may comprise glass or acrylic and be concave or convex in nature.

The cavity 34 extends between the front lens 30, the rear lens 32, and the sidewall 26. The shoulder 27 receives the front lens 30 and the rear lens 32 and stops them within the filter lens opening 28 along the interior surface 26S of the sidewall 26 to create the cavity 34. The rear lens 32 and the front lens 30 are separated by the shoulder 27 such that the cavity 34 includes a cross-sectional width that is substantially the same width as the shoulder 27. In embodiments, the front lens 30 and the rear lens 32 are circular, thereby matching the circular shape of the sidewall 26. In some embodiments, the front lens 30 and the rear lens 32 comprise anti-reflective coatings.

The cavity 34 includes the effects medium 22, which includes a homogenous or heterogenous fluid mixture, suspension, emulsion, or the like, configured to distort, reflect, refract, absorb, or bend light. For example, in one embodiment, the effects medium 22 may comprise a mixture of isopropyl alcohol and glitter, in which the glitter is suspended in the isopropyl alcohol. The glitter may be solvent resistant glitter so that it doesn't lose color or degrade within the solvent. The effects medium 22 may comprise any type of solvent for dissolving substances therein to create a particular effect. The effects medium 22, for example, may include water, acetic acid, acetone, acetonitrile, benzene, 1-butanol, 2-butanol, 2-butanone, t-butyl alcohol, carbon tetrachloride, chlorobenzene, chloroform, cyclohexane, 1,2-dichloroethane, diethylene, glycol, diethyl ether, diglyme (diethylene glycol dimethyl ether), 1,2-dimethoxy-ethane (glyme, DME), dimethyl-formamide (DMF), dimethyl sulfoxide (DMSO), 1,4-dioxane, ethanol, ethyl acetate, ethylene glycol, glycerin, heptane, hexamethylphosphoramide (HMPA), hexamethylphosphorous triamide (HMPT), hexane, methanol, methyl t-butyl ether (MTBE), methylene chloride, N-methyl-2-pyrrolidinone (NMP), nitromethane, pentane petroleum ether (ligroine), 1-propanol, 2-propanol, pyridine, tetrahydrofuran (THF), toluene, triethyl amine, water, heavy, o-xylene, m-xylene, or p-xylene. The effects medium 22 may also include a dye such as food coloring or fluorescent dye. In other embodiments, the effects medium 22 may include a mixture of isopropyl alcohol and water, isopropyl alcohol and fishing line isopropyl alcohol and film strips, isopropyl alcohol and paraffin, or isopropyl alcohol and crushed glass. In alternative embodiments, users may include in the effects medium 22 any liquid or substance of their choosing to achieve a desired result.

The cavity 34 may be filled with any quantity or volume of effects medium 22. For example, in one embodiment, half of the volume of the cavity 34 may be filled with the effects medium 22, and in other embodiments, more than half or less than have of the volume of the cavity 34 may be filled with the effects medium 22 for the purpose of creating different effects.

The body 24 also includes a first aperture 36A extending through the sidewall 26 for providing access to the cavity 34 and a first fastener 38A for sealing the first aperture 36A to prevent egress of the effects medium 22 from the cavity 34. The cavity 34 may be filled with the effects medium 22, such as with a syringe 23, or drained through the first aperture 36A to remove and replace the effects medium 22 with a different or replacement effects medium 22. In embodiments, the body 24 incudes a second aperture 36B extending through the sidewall 26 that is opposite the first aperture 36A and a second fastener 38B for sealing the second aperture 36B to prevent egress of the effects medium 22 from the cavity 34. The apertures 36A, 36B may comprise a threaded screw hole and the fasteners 38A, 38B may comprise screws, which screw into the threaded screw holes, respectively, to seal the apertures 36A, 36B.

The effect of the lens filter 18 is that it is capable of imitating multiple different types of optical filters, such as effects filters, diffusion filters, color conversion filters, graduated color conversion filters, neutral density filters, graduated neutral density filters, and optical flat filters. For example, optical flat filters are clear filters. These filters do not necessarily alter the image and are typically used to protect the lens from the elements such as, dirt, dust, stones, and water. Accordingly, the lens filter 18 can be configured to imitate an optical flat filter by not placing anything inside the cavity 34. Similarly, if the effects medium 22 is isopropyl, water, or any clear substance the lens filter 18 will imitate an optical flat filter.

Diffusion filters create a bloom around highlights as well as softened an image. The lens filter 18 can be configured to imitate a diffusion filter by using an effects medium 22 which includes isopropyl and micro pigments. For example, one may use an effects medium 22 that includes isopropyl and micro pigments measuring 15-30 μm.

Neutral density filters are designed to decrease the amount of light entering the lens. The lens filter 18 can be configured to imitate a neutral density filter by using an effects medium 22 that comprises a dark solution, such as a solution of isopropyl or water and black dye.

Graduated neutral density filters are similar to neutral density filters except only half of the filter is dark while the other half is clear. The lens filter 18 can be configured to imitate a graduated neutral density filter by using an effects medium 22 that comprises two solutions that do not mix, one of which is dyed black. For example, an effects medium 22 that includes clear water mixed separately with isopropyl which has been dyed black will result in an effects medium 22 that includes the dyed isopropyl sitting above the clear water. This will result in the top half of the lens filter 18 blocking light while the bottom half is clear.

An effects filter will add artifacts to an image such as lens flares, rainbows or streaks. The lens filter 18 can be configured to imitate an effects filter by using an effects medium 22 that comprises isopropyl and strands of fishing line. The fishing line will manipulate the light entering the lens and cause lens flares.

Color conversion filters alter the color profile of the image. The lens filter 18 can be configured to imitate a color conversion filter by using an effects medium 22 which includes isopropyl or water dyed with a specific color, such as red, orange, or blue.

Graduated color conversion filters are like color conversion filters except half of the filter is colored while the other half is clear. The lens filter 18 can be configured to imitate a graduated color conversion filter by using an effects medium 22 that includes two substances that do not mix, or are immiscible. For example, using an effects medium 22 that comprises half clear water and then half isopropyl which has been previously dyed orange will create an effects medium 22 including one half that is clear and the other half that is colored.

Wave filters distort an image as if the camera were under water. The lens filter 18 can be configured to imitate wave filters by using an effects medium 22 that includes two substances that are immiscible, such as water and isopropyl. When the effects medium 22 is disturbed, it creates an effect similar to wave filters.

Figure 3:
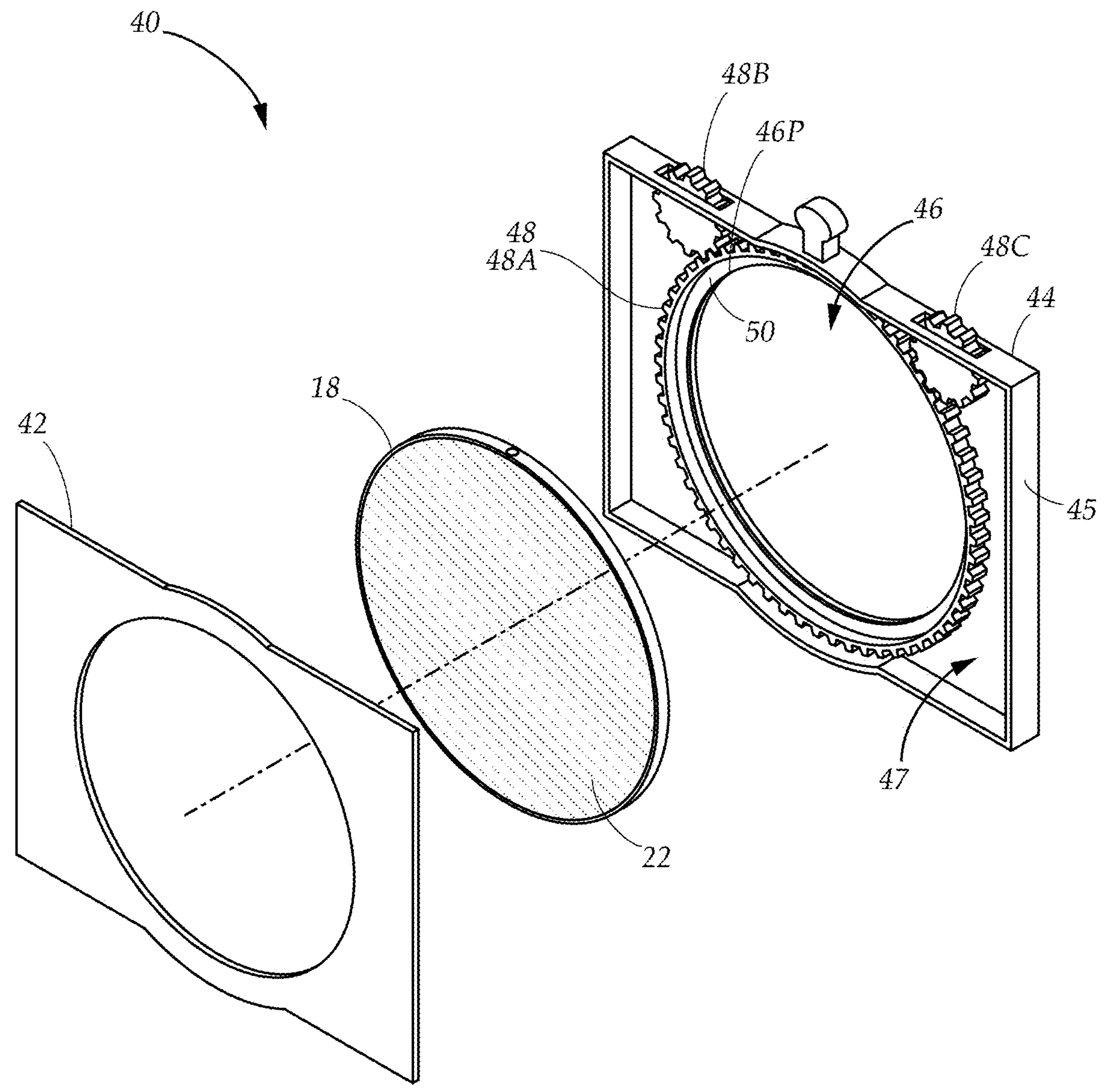
FIG. 3 is an exploded view of the lens filter housing of the dynamic lens filter and illuminated filter tray assembly, illustrating one manner in which the lens filter housing receives the lens filter and also showing the arrangement of rotating mechanism within the lens filter housing according to one embodiment of the present disclosure.
Figures 4, 5:
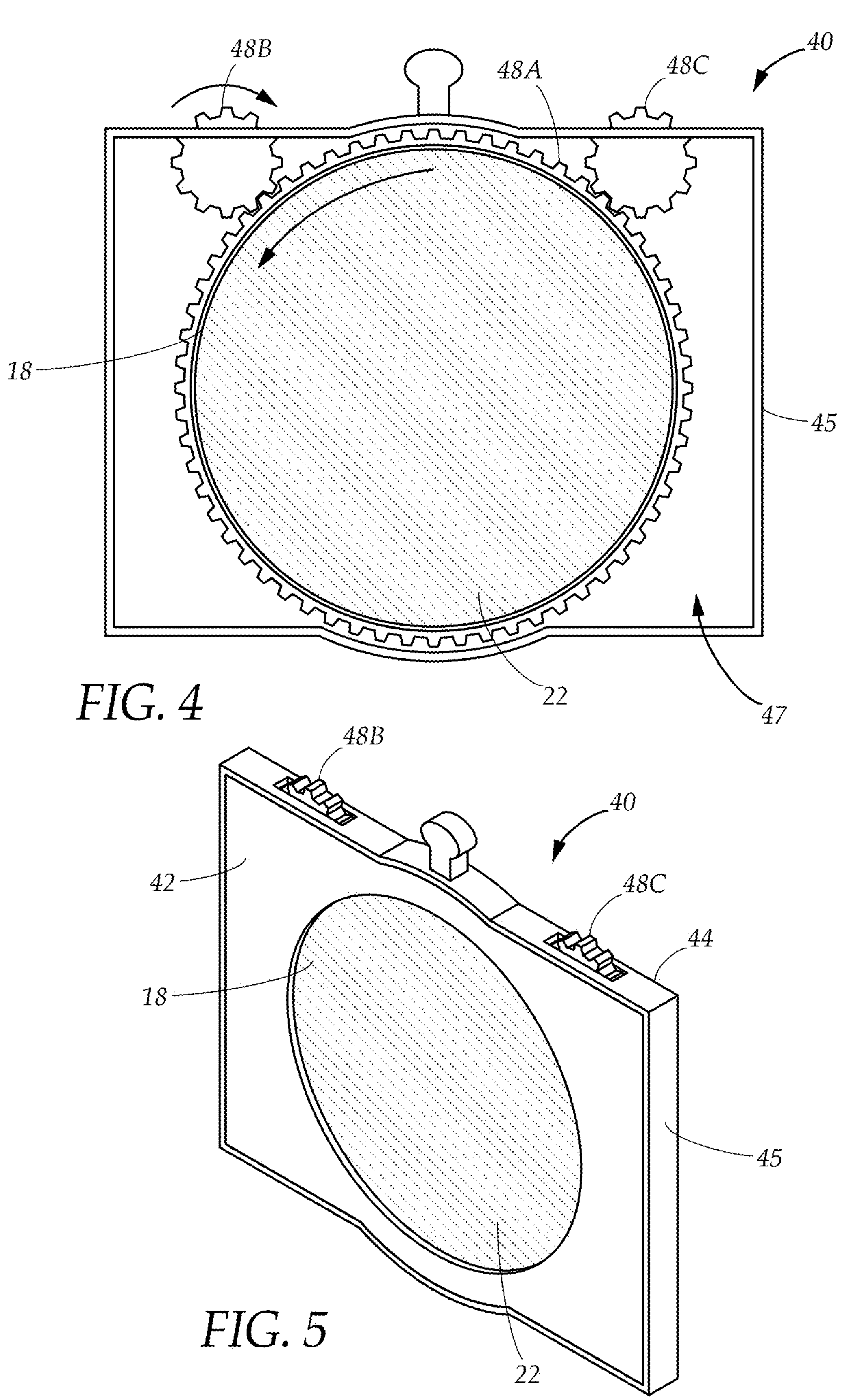
FIG. 4 is a cross-sectional front plan view of the lens filter housing of the dynamic lens filter and illuminated filter tray assembly, illustrating a manner in which the rotating mechanism rotates the lens filter within the lens filter housing according to one embodiment of the present disclosure.
FIG. 5 is a perspective view of the lens filter housing of the dynamic lens filter and illuminated filter tray assembly, illustrating the lens filter housing housed within the lens filter housing and its orientation with respect thereto according to one embodiment of the present disclosure.

Referring now to FIG. 3, FIG. 4, and FIG. 5 the dynamic lens filter and illuminated filter tray assembly further comprises a lens filter housing 40 in which the lens filter 18 is positioned. The lens filter housing 40 includes a front plate 42, a rear plate 44 including a sidewall 45, a lens filter housing opening 46 extending axially between the front plate 42 and rear plate 44 for receiving the lens filter 18, and a rotating mechanism 48 for selectively rotating the lens filter 18 within the lens filter housing 40. The lens filter housing opening 46 extends fully between the front plate 42 and the rear plate 44 and includes a perimeter edge 46P having an interior flange 50 for receiving and maintaining the lens filter 18 within the lens filter housing opening 46. The sidewall 45 defines a recess 47 for housing the rotating mechanism 48 and the lens filter 18.

The rotating mechanism 48 includes a rack-and-pinion-type actuator, in which the rack 48A is positioned around the perimeter edge 46P. The rack 48A is coupled to the lens filter 18 and the pinion 48B is coupled to the rack 48A. Rotation of the pinion 48B in one direction rotates the rack 48A and the lens filter 18 in the opposite direction. Rotation of the lens filter 18 enables a user to agitate and move the effects medium 22 within the lens filter 18 to allow the user to create a variety of changing visual effects on images being captured by a camera. Additionally, the rotating mechanism 48 enables a user to rotate the lens filter 18 relative to the illuminated filter tray 20 (see FIG. 10) to create a changing visual effect independent of the light striking the effects medium 22. In other words, a changing visual effect may be achieved by rotation of the lens filter 18 relative to the illuminated filter tray 20 (see FIG. 10) even if the light intensity or brightness striking the effects medium 22 stays constant. In embodiments, the rotating mechanism 48 may be motorized and controlled remotely by a control unit, such as a remote control.

The front plate 42 and the rear plate 44 attach to each other enclosing the rack 48A and lens filter 18 within the lens filter housing 40. The pinion 48B protrudes outwardly from the top of the sidewall 45 to an exterior of the lens filter housing 40 to be accessible for manual actuation by a user. In embodiments, the rotating mechanism 48 includes a second pinion 48C also coupled to the rack 48A and also protrudes outwardly from the top of the sidewall 45. The second pinion 48C is disposed opposite the pinion 48B such that it protrudes outwardly from an opposite side of the top of the sidewall 45. Rotation of the second pinion 48C in one direction rotates the rack 48A and the lens filter 18 in the opposite direction. The pinions 48B, 48C are positioned on opposite sides of the top of the sidewall 45 such that a user may access the rotating mechanism 48 to rotate the lens filter 18 on either side of the lens filter housing 40 when inserted into the matte box 16 (see FIG. 9). In operation, this provides a user ease when shooting images with a camera and operating the lens filter 18 at the same time.

Figure 6:
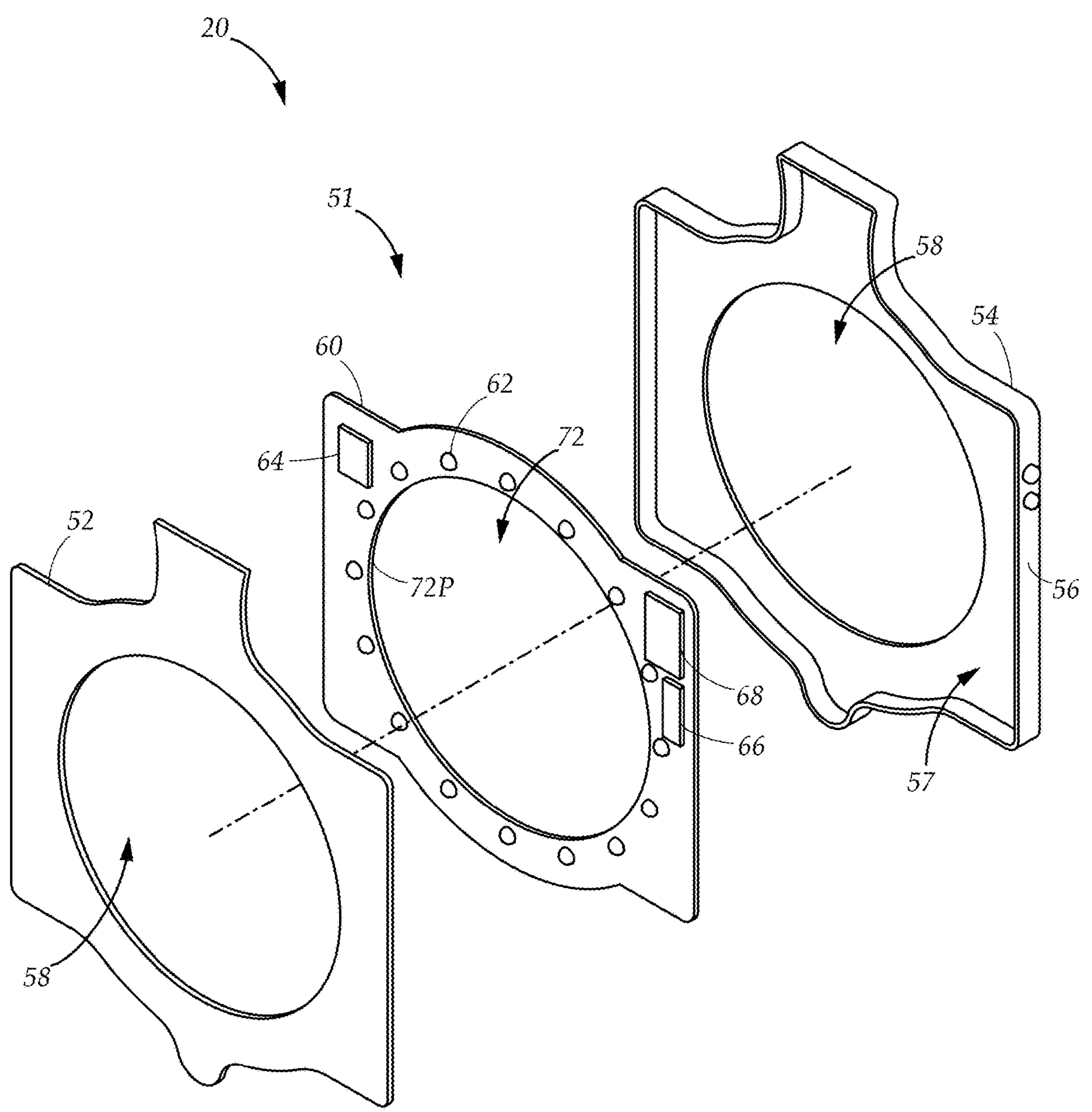
FIG. 6 is an exploded view of the illuminated filter tray of the dynamic lens filter and illuminated filter tray assembly, illustrating the illumination module and the filter tray housing and a manner in which the filter tray housing receives the illumination module according to one embodiment of the present disclosure.
Figure 7:
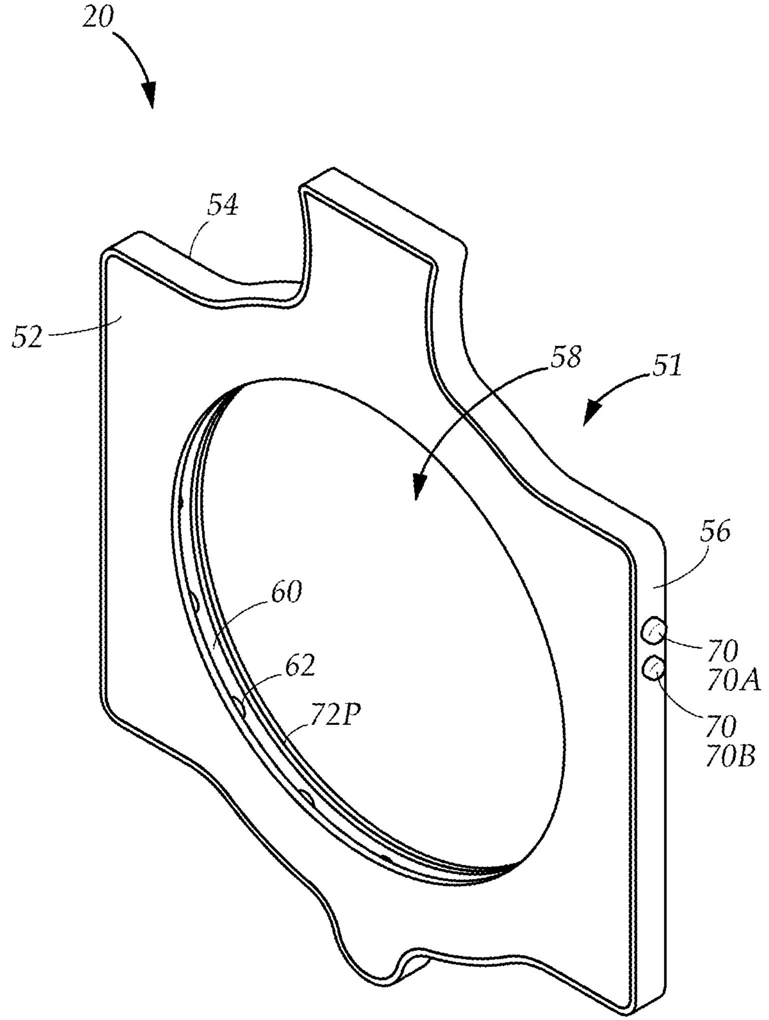
FIG. 7 is a perspective view of the illuminated filter tray of the dynamic lens filter and illuminated filter tray assembly, illustrating the illumination module housed within the filter tray housing and its orientation with respect thereto according to one embodiment of the present disclosure.

Referring now to FIG. 6 and FIG. 7, the illuminated filter tray 20 comprises a filter tray housing 51 including a front plate 52, a rear plate 54 opposite the front plate 52, a filter tray opening 58 extending axially through the housing 51 from the front plate 52 to the rear plate 54, an illumination module 60 including a plurality of light sources 62, a wireless transceiver 64 coupled to the light sources 62 for remotely controlling the light sources 62, a power source 66 coupled to the light sources 62, a control unit 68 coupled to the light sources 62, and light control inputs 70 coupled to the control unit 68 for manually controlling the light sources 62.

The illumination module 60 comprises a planar body including a central module opening 72 extending axially therethrough. Note, the illumination module 60 may comprise a circuit board or any other hardware known in the art that enables communication/coupling between the foregoing components of the illumination module 60. The central module opening 72 includes a perimeter edge 72P. The light sources 62 are positioned around the module opening 72 along the perimeter edge 72P. In embodiments, the light sources 62 are positioned along the perimeter edge 72P to form a ring of light sources 62 around the module opening 72. The light sources 62 may be spaced around the perimeter edge 72P at regular intervals or irregular intervals. The light sources 62 emanate light radially outwardly toward the module opening 72. In embodiments, the light sources are light emitting diodes (LEDs) lights; however, in other embodiments, the light sources may comprise condensed fluorescent (CFL) lights, incandescent lights, or halogen lights.

The rear plate 54 includes a perimeter sidewall 56 that defines a recess 57 that receives and houses the illumination module 60 therein. The front plate 52 and the rear plate 54 attach to each other around the illumination module 60 enclosing the illumination module 60 within the filter tray housing 51. The module opening 72 is aligned in parallel with the filter tray opening 58 and includes substantially the same diameter as the filter tray opening 58, such that the light sources 62 are positioned around the filter tray opening 58 and are able to emanate light out of the filter tray housing 51 and toward the lens filter 18 (see FIG. 10).

The light control inputs 70 include a light source intensity control input 70A for manually controlling the intensity and brightness of the light sources 62 and a power control input 70B for manually powering the light sources 62 on and off. Via the light intensity control input 70A, a user instructs the control unit 68 to operate the light sources 62 to illuminate the lens filter 18 (see FIG. 10) to create a desired effect including dimming, direction, and color control, such as color temperature, and red, blue, and green (RBG) lighting. In embodiments, the light source intensity control input 70A and the power control input 70B are push buttons operably coupled to the control unit 68 and power source 66, respectively. The push buttons project from the perimeter sidewall 56 such that they are accessible to a user.

Alternatively, a user may use the wireless transceiver 64 to wirelessly control the illumination module 60 to operate the light sources 62 remotely. In embodiments, the wireless transceiver 64 is a Bluetooth transceiver capable of syncing with an application programming interface (API), such as the software on a camera or smart electronic device, such as a smart phone, enabling remote control of the illumination module 60. Using a graphic user interface (GUI), such as the display of the camera or display of the smart phone, which is coupled to, or part of the API, the user is then able to control the light sources 62 and its various effects as well as power the light sources 62 on and off through the camera or the smart phone.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Spatially relative terms, such as "beneath," "below," "lower," "above," "upper" and the like, are used herein for ease of description to describe one element or feature's relationship to another element(s) or feature(s) as illustrated in the figures. It is understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly. The term "substantially" is defined as at least 95% of the term being described and/or within a tolerance level known in the art and/or within 5% thereof.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

In conclusion, herein is presented a dynamic lens filter and illuminated filter tray assembly. The disclosure is illustrated by example in the drawing figures, and throughout the written description. It should be understood that numerous variations are possible, while adhering to the inventive concept. Such variations are contemplated as being a part of the present disclosure.

What is claimed is:

1. A dynamic lens filter assembly with an illuminated filter tray for use with a camera having a camera lens and a matte box positioned in front of the camera lens, comprising:

a lens filter comprising a front, a rear, and a body including a sidewall defining a lens filter opening extending between the front and the rear, the lens filter further comprising a front lens attached to the sidewall at the front and a rear lens attached to the sidewall at the rear forming a cavity disposed inside of the body, the cavity being capable of retaining a fluid effects medium; and an illuminated filter tray comprising a filter tray housing including a front plate, a rear plate, a filter tray opening extending through the housing, the filter tray opening including a light source, the light source selectively emanating light toward the filter tray opening;

wherein the illuminated filter tray is aligned with the lens filter in the matte box such that light emanating from the illuminated filter tray is configured to strike a fluid effects medium placed in the lens filter, thereby generating a visual effect.

2. The dynamic lens filter assembly with the illuminated filter tray of claim 1, further comprising a lens filter housing in which the lens filter is capable of being positioned, the lens filter housing including a rotating mechanism coupled to the lens filter that selectively rotates the lens filter with respect to the housing.

3. The dynamic lens filter assembly with the illuminated filter tray of claim 1, wherein the illuminated filter tray comprises an illumination module including the light source, a power source coupled to the light sources, a control unit coupled to the light source, and a light control input for manually controlling the light sources.

4. The dynamic lens filter assembly with the illuminated filter tray of claim 2, wherein the rotating mechanism includes a rack-and-pinion-type actuator, whereby rotation of the pinion in one direction rotates the rack and the lens filter in the opposite direction.

5. The dynamic lens filter assembly with the illuminated filter tray of claim 4, wherein the lens filter housing comprises a rear plate, a front plate, and a housing opening extending between the rear plate and the front plate for positioning the lens filter, the rack positioned around the opening, the lens filter housing enclosing the rack and lens filter therein, the pinion protruding out of the lens filter housing to be accessible for manual actuation.

6. The dynamic lens filter assembly with the illuminated filter tray of claim 3, wherein the illumination module includes a module opening including a light source positioned therearound, the module opening including substantially the same diameter as filter tray opening, the filter tray opening aligned with the housing opening.

7. The dynamic lens filter assembly with the illuminated filter tray of claim 3, wherein the light control input includes a light source intensity control input for controlling the intensity and brightness of the light source and a power control input for powering the light source on and off.

8. The dynamic lens filter assembly with the illuminated filter tray of claim 1, wherein:

the body includes an aperture extending through the sidewall for providing access to the cavity; and the lens filter comprises a cap for sealing the aperture to prevent egress of the effects medium from the cavity.

9. The dynamic lens filter assembly with the illuminated filter tray of claim 1, wherein the sidewall of the lens filter incudes an interior surface having a shoulder extending therearound, the shoulder preventing further insertion of the front lens and the rear lens into the opening of the lens filter.

10. The dynamic lens filter assembly with the illuminated filter tray of claim 1, wherein the illuminated filter tray is positioned within the matte box between the lens filter and the camera lens.

11. The dynamic lens filter assembly with the illuminated filter tray of claim 10, wherein:

the light source emanates light toward the filter tray; and the light source emanates light either away from the camera lens or towards the camera lens.

12. The dynamic lens filter assembly with the illuminated filter tray of claim 3, further comprising a wireless transceiver coupled to the light source for controlling the light source remotely.

13. The dynamic lens filter assembly with the illuminated filter tray of claim 1, wherein the cavity includes the effects medium, and the effects medium comprises a homogeneous or heterogeneous fluid mixture configured to distort, refract, reflect, absorb, or bend light.

14. The dynamic lens filter assembly with the illuminated filter tray of claim 1, wherein the cavity includes the effects medium, and the effects medium includes a solvent and a material selected from the group consisting of a food coloring, a dye, a fluorescent dye, micro pigments, fishing line, film strips, paraffin, glitter, and glass.

15. A dynamic lens filter, comprising:

a lens filter including a front, a rear, a body including a sidewall defining a lens filter opening extending between the front and the rear, a front lens attached to the sidewall at the front, and a rear lens attached to the sidewall at the rear forming a cavity inside of the body extending between the front lens, the rear lens, and the sidewall, the cavity including a fluid effects medium therein, the body further including an aperture extending through the sidewall for providing access to the cavity, the lens filter further including a cap for sealing the aperture; and a lens filter housing including a rotating mechanism coupled to the lens filter that selectively rotates the lens filter with respect to the housing.

16. The dynamic lens filter of claim 15, wherein the rotating mechanism includes a rack-and-pinion-type actuator, whereby rotation of the pinion in one direction rotates the rack and the lens filter in the opposite direction.

17. The dynamic lens filter of claim 16, wherein the lens filter housing comprises a rear plate, a front plate, and a housing opening extending between the rear plate and the front plate for positioning the lens filter, the rack positioned around the opening, the lens filter housing enclosing the rack and lens filter therein, the pinion protruding out of the lens filter housing to be accessible for manual actuation.

18. The dynamic lens of claim 15, wherein the sidewall of the lens filter incudes an interior surface having a shoulder extending therearound, the shoulder preventing further insertion of the front lens and the rear lens into the opening of the lens filter.

19. The dynamic lens filter of claim 15, wherein the effects medium includes a solvent and a material selected from the group consisting of a food coloring, a dye, a fluorescent dye, micro pigments, fishing line, film strips, paraffin, and glass.

20. The dynamic lens filter of claim 15, wherein the effects medium is a homogeneous or heterogeneous fluid mixture configured to distort, refract, reflect, absorb, or bend light.

* * * * *